US011842560B1

(12) United States Patent
Chang et al.

(10) Patent No.: US 11,842,560 B1
(45) Date of Patent: Dec. 12, 2023

(54) FINGERPRINT SENSING CIRCUIT

(71) Applicant: HIMAX TECHNOLOGIES LIMITED, Tainan (TW)

(72) Inventors: Yaw-Guang Chang, Tainan (TW); Jia-Ming He, Tainan (TW); Zong-You Hou, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/322,609

(22) Filed: May 24, 2023

(51) Int. Cl.
*G06V 40/13* (2022.01)
(52) U.S. Cl.
CPC ................................ *G06V 40/1318* (2022.01)
(58) Field of Classification Search
CPC ............. G02F 1/13338; G02F 1/13312; G02F 1/133512; G02F 1/133514; G02F 1/134336; G02F 1/134345; G06F 3/0412; G06F 3/042; G06F 3/0421; G06F 3/0488; G06V 40/1318; G09G 3/3648; G09G 2300/0439; G09G 2300/0809; G09G 2320/029; G09G 2320/0626; G09G 2360/144; H10K 59/12; H10K 59/40; H10K 59/60; G02B 5/20
See application file for complete search history.

(56) References Cited

U.S. PATENT DOCUMENTS

| | | | |
|---|---|---|---|
| 2012/0049048 A1* | 3/2012 | Dyer | G01J 1/44 250/214 AL |
| 2014/0267202 A1* | 9/2014 | Zheng | G09G 5/10 345/207 |
| 2020/0370953 A1* | 11/2020 | Vu | G01J 1/32 |

* cited by examiner

*Primary Examiner* — Abhishek Sarma
(74) *Attorney, Agent, or Firm* — CKC & Partners Co., LLC

(57) ABSTRACT

The fingerprint sensing circuit includes pixel sensors with photo sensors. Sensing currents produced by first pixel sensors are averaged. The average current is subtracted from sensing current produced by second pixel sensors to generate a difference current. During a capture period, a converting circuit outputs a digital signal in response to the difference current. This circuit aims to reduce noise in fingerprint recognition technology.

16 Claims, 10 Drawing Sheets

FINGERPRINT SENSING CIRCUIT

BACKGROUND

Field of Invention

The present invention relates to a fingerprint sensing circuit capable of increasing signal-to-noise ratio.

Description of Related Art

Fingerprint recognition has become increasingly popular in electronic devices today, where it is used to identify whether the user is the authorized individual. Many smartphones now come with fingerprint recognition functionality, with some devices placing the fingerprint recognition circuitry beneath the display screen. This allows for greater flexibility and convenience in using the phone's screen. One approach to achieve this is through optical fingerprint recognition, which uses the backlight module of the display screen to emit light that is reflected from the fingerprint and detected by a photo sensor. However, since the signal magnitude of the photo sensor is low, it is highly susceptible to noise interference, making it a key concern for technical experts in this field who aim to reduce sensor noise and improve recognition accuracy.

SUMMARY

Embodiments of the present disclosure provide a fingerprint sensing circuit including multiple pixel sensors, multiple buffers, an average circuit, a converting circuit and at least one current source. The pixel sensors include multiple first pixel sensors and multiple second pixel sensors, and each of the pixel sensors includes a photo sensor. The buffers are electrically connected and corresponding to the first pixel sensors respectively. In a sample period, each of the first pixel sensors is configured to generate a first sensing current in response to alight intensity sensed by the corresponding photo sensor, and the buffers are configured to generate multiple reference currents in response to the first sensing currents. The average circuit is configured to generate at least one average current by averaging the reference currents. The converting circuit is electrically connected to one of the second pixel sensors. The current source is arranged between the converting circuit and the one of the second pixel sensors. The current source is configured to provide the average current. In the sample period, the one of the second pixel sensors is configured to generate a second sensing current in response to alight intensity sensed by the corresponding photo sensor, and the current source is configured to substrate the average current from the second sensing current to generate a difference current. In a capture period, the converting circuit is configured to output a digital signal in response to the difference current.

In some embodiments, the photo sensors of the first pixel sensors are covered by a shielding layer.

In some embodiments, the second pixel sensors and the first pixel sensors are arranged in a same row of pixels.

In some embodiments, the buffers are unit gain buffers. Each of the buffers includes: a first input terminal electrically connected to the corresponding first pixel sensor; a second input terminal electrically connected to a fixed voltage; a P-type output stage configured to provide a first reference current; and a N-type output stage configured to provide a second reference current.

In some embodiments, the average current includes a first average current and a second average current. The average circuit includes: a first current mirror electrically connected to the P-type output stages of the buffers and configured to provide the first average current; and a second current mirror electrically connected to the N-type output stages of the buffers and configured to provide the second average current.

In some embodiments, the current source includes a first current source and a second current source. The first current source is configured to provide the first average current, and the second current source is configured to provide the second average current.

In some embodiments, the converting circuit includes: an integrator having an input terminal electrically connected to the one of the second pixel sensors; an analog-to-digital converter electrically connected to an output terminal of the integrator; and a reset switch arranged between the input terminal of the integrator and the output terminal of the integrator.

In some embodiments, the fingerprint sensing circuit further includes multiple gate switches arranged in the first pixel sensors and the second pixel sensors respectively to output the first sensing currents or the second sensing current.

In some embodiments, in a exposure period, the gate switches are turned off, the reset switch is turned on, and the analog-to-digital converter is disabled. In the sample period, the gate switches are turned on, the reset switch is turned off, and the analog-to-digital converter is disabled. In the capture period, the gate switches are turned off, the reset switch is turned off, and the analog-to-digital converter is enabled.

In some embodiments, the first pixel sensors are the same as the second pixel sensors respectively, and the first pixel sensors are arranged in the same row of pixels.

In some embodiments, the buffers are unit gain buffers, and each of the buffers includes: a first input terminal electrically connected to the corresponding first pixel sensor; a second input terminal electrically connected to a fixed voltage; a P-type output stage configured to provide a first reference current; and a N-type output stage configured to provide a second reference current.

In some embodiments, the average current includes a first average current and a second average current. The average circuit includes: a first current mirror electrically connected to the P-type output stages of the buffers, in which a gain of the first current mirror is equal to a reciprocal of a number of the first pixel sensors, and the first current mirror is configured to provide the first average current; and a second current mirror electrically connected to the N-type output stages of the buffers, in which a gain of the second current mirror is equal to the reciprocal of the number of the first pixel sensors, and the second current mirror is configured to provide the second average current.

In some embodiments, the current source includes a first current source and a second current source. The first current source is configured to provide the first average current, and the second current source is configured to provide the second average current.

In some embodiments, the fingerprint sensing circuit further includes: multiple gate switches arranged in the first pixel sensors to output the first sensing currents; a reset switch arranged between one of the buffers and the converting circuit; and a first switch, arranged between the reset switch and the converting circuit.

In some embodiments, the converting circuit includes: an analog-to-digital converter electrically connected to the one of the buffers; a second switch arranged between the first switch and the analog-to-digital converter; and a sample capacitor having a first end arranged between the first switch and the second switch, and a second end electrically connected to a ground terminal.

In some embodiments, in the exposure period, the gate switches are turned off, the reset switch is turned on, the first switch is turned off, the second switch is turned off, and the analog-to-digital converter is disabled. In a reset period, the gate switches are turned off, the reset switch is turned on, the first switch is turned on, the second switch is turned off, and the analog-to-digital converter is disabled. In the sample period, the gate switches are turned on, the reset switch is turned off, the first switch is turned on, the second switch is turned off, and the analog-to-digital converter is disabled. In the capture period, the gate switches are turned off, the reset switch is turned on, the first switch is turned off, the second switch is turned on, and the analog-to-digital converter is enabled.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence. In addition, the term "couple" used in the specification should be understood for electrically connecting two units directly or indirectly.

Figure 1:
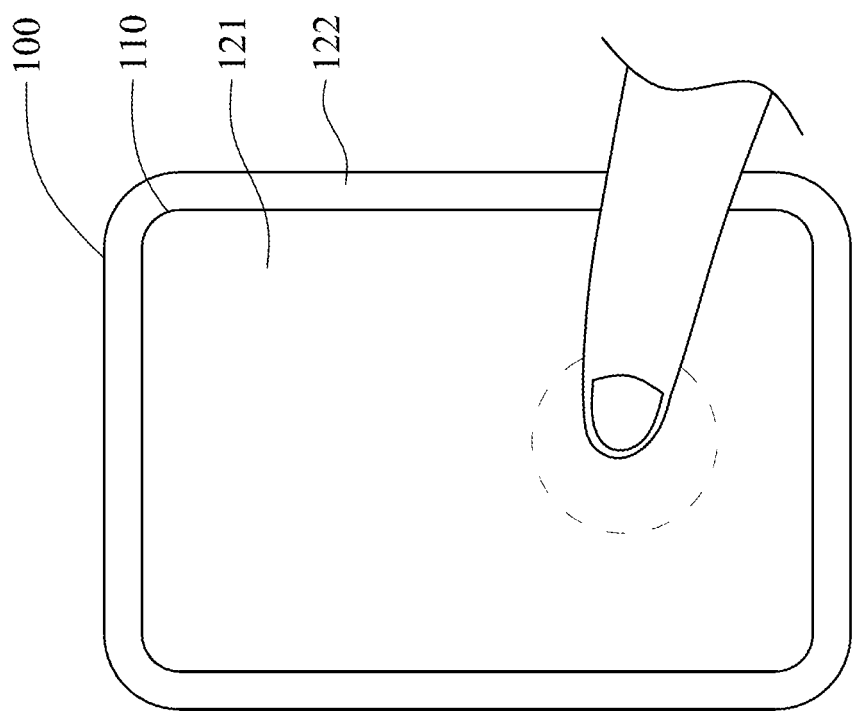
FIG. 1 is a diagram of a display device in accordance with an embodiment.

FIG. 1 is a diagram of a display device in accordance with an embodiment. Referring to FIG. 1, a display device 100 is a smart phone, but it may be a tablet, a laptop, a display which is not limited in the disclosure. The display device 100 has a display area 121 and a non-display area 122, in which the display area 121 is surrounded by the non-display area 122. The display device 100 includes a display panel 110 and a fingerprint sensing circuit (not shown) arranged beneath the display panel 110. The fingerprint sensing circuit includes multiple pixel sensors, and each pixel sensor includes a photo sensor. The user's fingerprint can be detected when he or she puts the finger on the display panel 110.

The pixel sensors are classified as first pixel sensors or second pixel sensors according to their function. The currents sensed by the first pixel sensors are averaged as a reference which will be subtracted from the currents sensed by the second pixel sensors to remove the noises. Two embodiments are provided below based on the arrangement of the pixel sensors.

First Embodiment

In the first embodiment, the second pixel sensors are arranged in the display area 121, and the first pixel sensors are arranged in the non-display area 122. The first pixel sensors are also referred to as dummy pixel sensors.

Figure 2:
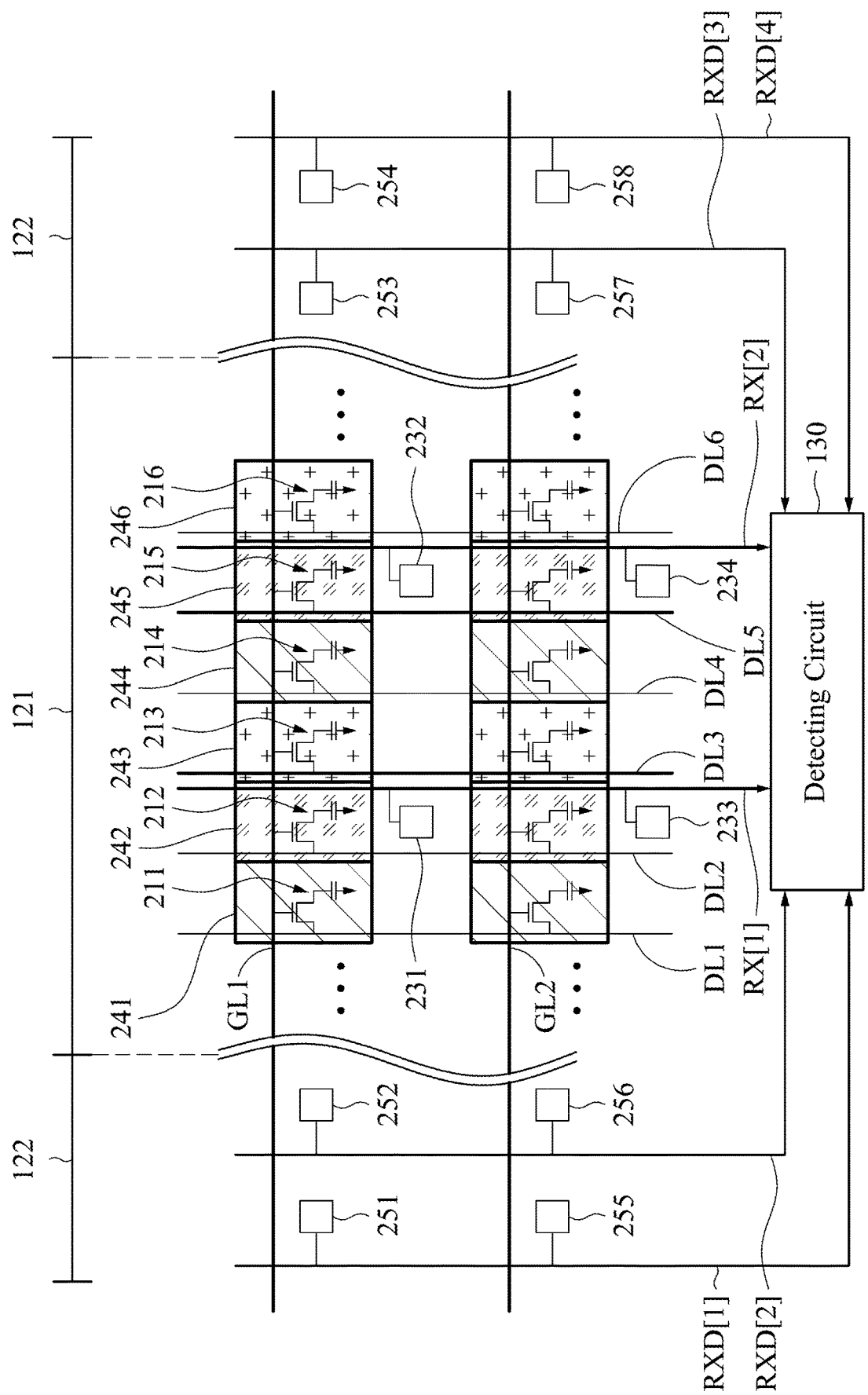
FIG. 2 is a diagram illustrating the arrangement of the pixel sensor of the display device in accordance with the first embodiment.

FIG. 2 is a diagram illustrating the arrangement of the pixel sensor of the display device in accordance with the first embodiment. Referring to FIG. 1 and FIG. 2, the display device includes multiple pixel unit (e.g. pixel units 211-216), second pixel sensor 231-234, multiple color filters (e.g. color filters 241-246), gate lines GL1-GL2, data lines DL1-DL6, and sensing lines RX[1] and RX[2] in the display area 121. The display panel 110 is a liquid crystal display panel in the embodiment, but it may be an organic light-emitting diode (LED) panel or a micro LED panel which is not limited in the disclosure. Each of the pixel units 211-216 includes a thin film transistor (TFT) and a pixel electrode (not shown). The gate of the TFT is connected to the gate line GL1, the source of the TFT is electrically connected to the corresponding one of the data lines DL1-DL6, and the drain of the TFT is electrically connected to the corresponding pixel electrode. The color filters 241-246 correspond to the pixel unit 211-216 respectively with colors of red, green and blue which are arranged repeatedly. The display device also includes a backlight module (not shown) arranged beneath the display panel 110 for providing a light source. In the embodiment of the display panel 110 being the organic LED panel, the light source may be provided by the LED, and thus no backlight module is needed. Two rows of pixels are illustrated in FIG. 2. The second pixel sensors 231-232 are arranged in the first row of pixels, and the second pixel sensors 233-234 are arranged in the second row of pixels. The color filters 241-246 would not cover the second pixel sensors 231-234. The second pixel sensors 231 and 233 are electrically connected to a detecting circuit 130 through the sensing line RX[1], and the second pixel sensors 232 and 234 are electrically connected to the detecting circuit 130 through the sensing line RX[2].

First pixel sensors 251-258 are arranged in the non-display area 122. The first pixel sensors 251-258 are covered by a shielding layer which may be a black matrix (BM). The first pixel sensors 251 and 255 are electrically connected to the detecting circuit 130 through a sensing line RXD[1]. The first pixel sensors 252 and 256 are electrically connected to the detecting circuit 130 through a sensing line RXD[2]. The first pixel sensors 253 and 257 are electrically connected to the detecting circuit 130 through a sensing line RXD[3]. The first pixel sensors 254 and 258 are electrically connected to the detecting circuit 130 through a sensing line RXD[4]. The first pixel sensors 251-254 and the second pixel sensors 231 and 232 are arranged in the same row of pixels (i.e. corresponding to the same gate line), and thus they are activated simultaneously. The current sensed by the first pixel sensors 251-254 will be averaged so as to remove the noises of the current sensed by the second pixel sensors 231 and 232. Similarly, the first pixel sensors 255-258 and the second pixel sensors 233 and 234 are arranged in the same row of pixels. The current sensed by the first pixel sensors 255-258 will be averaged so as to remove the noises of the current sensed by the second pixel sensors 233 and 234. The first pixel sensors 251-258, the second pixel sensors 231-234, and the detecting circuit are together referred to as the fingerprint sensing circuit.

Figure 3:
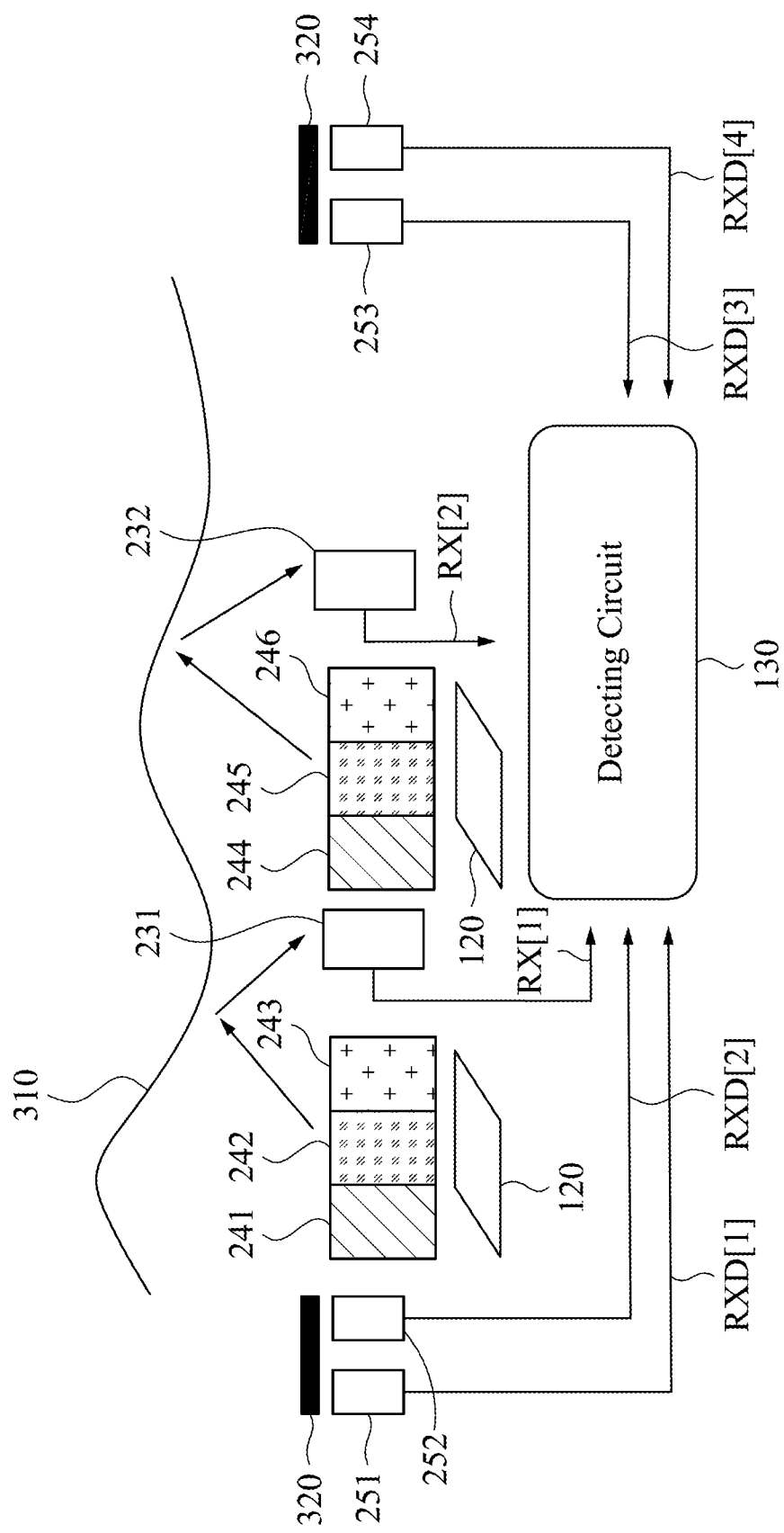
FIG. 3 is a schematic diagram illustrating a scenario for recognizing fingerprints according to an embodiment.

FIG. 3 is a schematic diagram illustrating a scenario for recognizing fingerprints according to an embodiment. Referring to FIGS. 2 and 3, the ridges and valleys on a finger 310 are sensed for fingerprint recognition. The backlight module provides light, which passes through the color filters 241-246 and reaches the finger 310. The light is then reflected back and captured by the second pixel sensors 231 and 232. Based on the intensity of the light, the second pixel sensors 231 and 232 generate corresponding currents which are transmitted to the detecting circuit 130 via the sensing lines RX[1]-RX[2]. Here, the second pixel sensor 231 corresponds to the pixel units 211-213 and the second pixel sensor 232 corresponds to the pixel units 214-216. In other words, each second pixel sensor corresponds to 3 pixel units because the pixel units 211-213 are respectively red, green, and blue sub-pixels, and these three sub-pixels combined together can generate white light. In other embodiments, if the display panel also includes white sub-pixels, each white sub-pixel can also correspond to a second pixel sensor. In this embodiment, the second pixel sensors 231-234 are located in a specific area on the display panel, but in other embodiments, the second pixel sensors can be distributed throughout the entire display panel, which means that fingerprints can be recognized at any location on the display panel. On the other hand, the shielding layer 320 covers the first pixel sensors 251-254, and therefore the light intensity sensed by the first pixel sensors is the lowest that reflects the noise within the display device.

Figure 4:
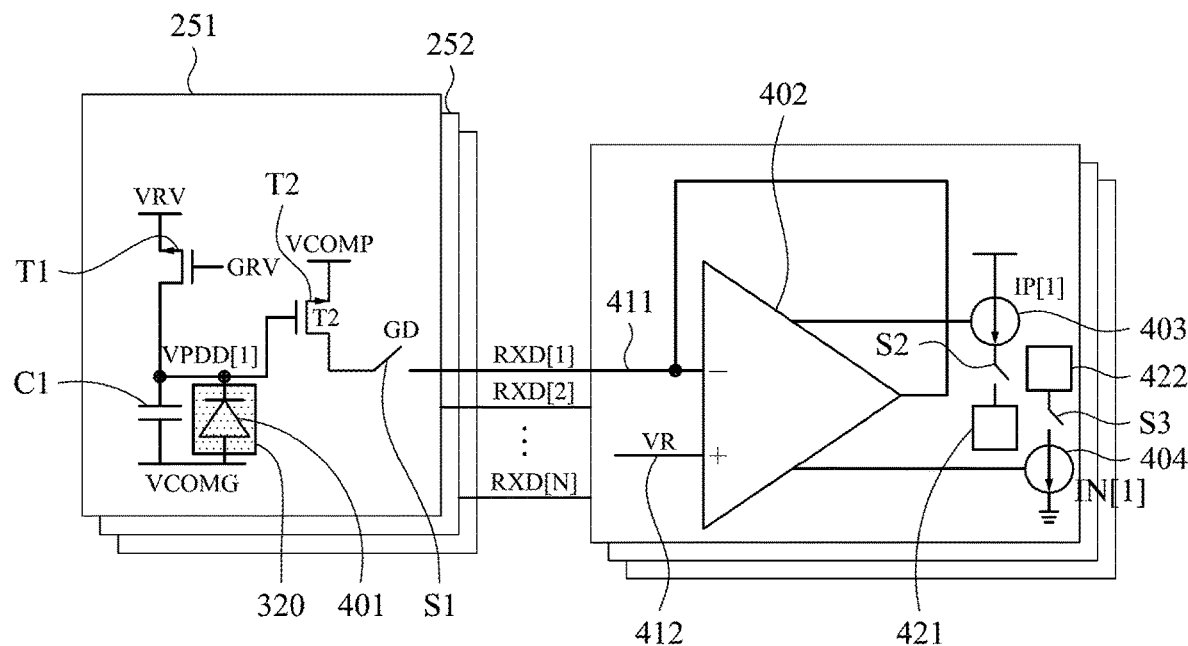
FIG. 4 is a schematic diagram illustrating the first pixel sensor and related circuitry according to the first embodiment.

FIG. 4 is a schematic diagram illustrating the first pixel sensor and related circuitry according to the first embodiment. Referring to FIG. 4, each first pixel sensor is identical, and herein the first pixel sensor 251 is taken as an example. The first pixel sensor 251 includes a photo sensor 401, a capacitor C1, transistors T1 and T2, and a gate switch S1. The photo sensor 401 is covered by the shielding layer 320, and its first end is electrically connected to a first end of the capacitor C1. A second end of the photo sensor 401 and a second end of the capacitor C1 are electrically connected to a voltage VCOMG. A first end of the transistor T1 is electrically connected to a voltage VRV, and its second end is electrically connected to the first end of photo sensor 401. A control end of the transistor T1 is electrically connected to a signal GRV. A first end of the transistor T2 is electrically connected to a voltage VCOMP, and its second end is electrically connected to the gate switch S1. A control end of the transistor T2 is electrically connected to the first end of the photo sensor 401. The gate switch S1 is electrically connected to the signal line RXD[1]. During a sample period, the photo sensor 401 generates a leakage current in response to the detected light intensity, which determines the voltage at the control terminal of the transistor T2, thereby generating a first sensing current whish is output to the sensing line RXD[1] through the gate switch S1.

The buffer 402 is arranged inside the detecting circuit 130 which is shown in FIG. 2. The buffer 402 is electrically connected to the pixel sensor 251 through the sensing line RXD[1]. The buffer 402, such as a unit gain buffer, includes a first input terminal 411 (e.g., the negative input terminal), a second input terminal 412 (e.g., the positive input terminal), a P-type output stage 403, and an N-type output stage 404. The P-type output stage 403 of the buffer 402 is, for example, a P-type transistor, while the N-type output stage 404 is, for example, an N-type transistor. In this embodiment, the buffer 402 is an AB-class differential amplifier, but it should be understood that the present disclosure is not limited to the specific circuit of the buffer 402. The first input terminal 411 of the buffer 402 is electrically connected to the first pixel sensor 251, while the second input terminal 412 is electrically connected to a fixed voltage VR. In response to the first sensing current on the sensing line RXD[1], the buffer 402 provides a first reference current IP[1] to an average circuit 421 through the P-type output stage 403, and provides a second reference current IN[1] to an average circuit 422 through the N-type output stage 404.

For each first pixel sensor, a corresponding first reference current and a corresponding second reference current will be generated. For example, the first pixel sensor 252 is connected to another buffer through the sensing line RXD[2], thereby generating a first reference current IP[2] and a second reference current IN[2], and so on. Each first pixel sensor and its corresponding buffer are referred to as a channel. In other words, the buffers on all channels will generate corresponding first reference currents IP[1]-IP[N] and second reference currents IN[1]-IN[N] based on the sensing current on the corresponding sensing lines RXD[1]-RXD[N] where N is the number of first pixel sensors. The aforementioned reference currents will be averaged in the average circuits 421 and 422 to generate at least one average current.

Figure 5:
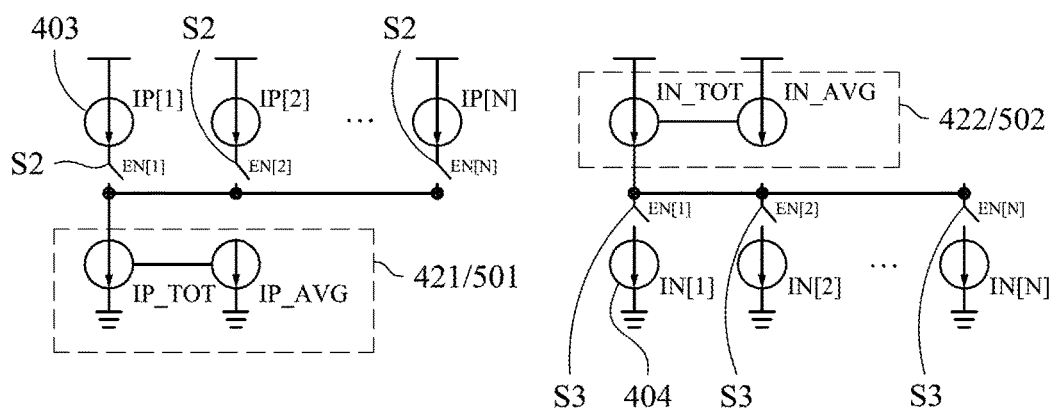
FIG. 5 is a schematic diagram of the average circuit in accordance with the first embodiment.

Specifically, FIG. 5 illustrates a schematic diagram of the average circuit in accordance with the first embodiment. Referring to FIG. 5, the average circuit 421 includes a first current mirror 501, which is electrically connected to the P-type output stages (e.g., P-type output stage 403) of all channels and receives the first reference currents IP[1]-IP[N]. Multiple switches S2 are arranged between the average circuit 421 and the corresponding P-type output stages. The switches S2 are controlled by signals EN[1]-EN[N]. These switches S2 determine how many reference currents are to be averaged. On the other hand, the gain of the first current mirror 501 can be adjusted by setting the number of transistors in the first current mirror 501, which is related to the number of conductive switches S2 in order to calculate the correct average current. For example, when all switches S2 are conductive, the gain of the first current mirror 501 is equal to the reciprocal of the number of the first pixel sensors, providing a total current IP_TOT and a first average current IP_AVG. The total current IP_TOT is equal to the sum of all first reference currents IP[1]-IP[N], and the first average current IP_AVG is equal to the total current IP_TOT divided by N. However, it is also possible to only turn on a subset of the switches S2. For example, if N is a positive integer of 8, but only the average of 4 reference currents is needed, then only four of the switches S2 need to be turned on while the other four switches S2 are turned off, and the gain of the first current mirror is then set to be ¼.

Similarly, the average circuit 422 includes a second current mirror 502, which is electrically connected to the N-type output stages of all channels to receive the second reference currents IN[1]-IN[N]. Multiple switches S3 are arranged between the average circuit 422 and the corresponding N-type output stage, and these switches S3 are also controlled by the signals EN[1]-EN[N]. The gain of the second current mirror 502 is equal to the reciprocal of the number of turned-on switches S3. For example, when all switches S3 are turned on, the gain of the second current mirror 502 is 1/N, which provides the total current IN_TOT and the average current IN_AVG. The total current IN_TOT is equal to the sum of all second reference currents IN[1]-IN[N], while the second average current IN_AVG is equal to the total current IN_TOT divided by N.

Referring to FIG. 4, the voltages VRV and VCOMP are negative while the voltage VR is positive in the embodiment, so in most cases, the current flows from the buffer 402 to the first pixel sensor 251. Therefore, the first reference current IP[1] is generally greater than the second reference current IN[1]. According to the operating principle of the AB-class differential amplifier, when the first reference current IN[1] is greater than 0, the second reference current IP[1] will be close to 0, and thus only the average circuit 421 is required. If the voltage VRV and VCOMP are set to be positive values, causing the current to flow from the pixel sensor 251 to the buffer 402 in most cases, then the second reference current IN[1] will be greater than the first reference current IP[1] (which is close to 0), and thus requiring only the average circuit 422. In order to satisfy both of the above configuration, both the average circuit 421 and the average circuit 422 are set up. If the voltages VRV and VCOMP are predetermined, and the current flow direction between first pixel sensor 251 and buffer 402 is also determined in advance, then it is possible to need only one of the first reference current IP[1] and the second reference current IN[1], and requiring only one of the corresponding average circuit 421 and average circuit 422. In such cases, buffer 402 may be an A-type differential amplifier.

Figure 6:
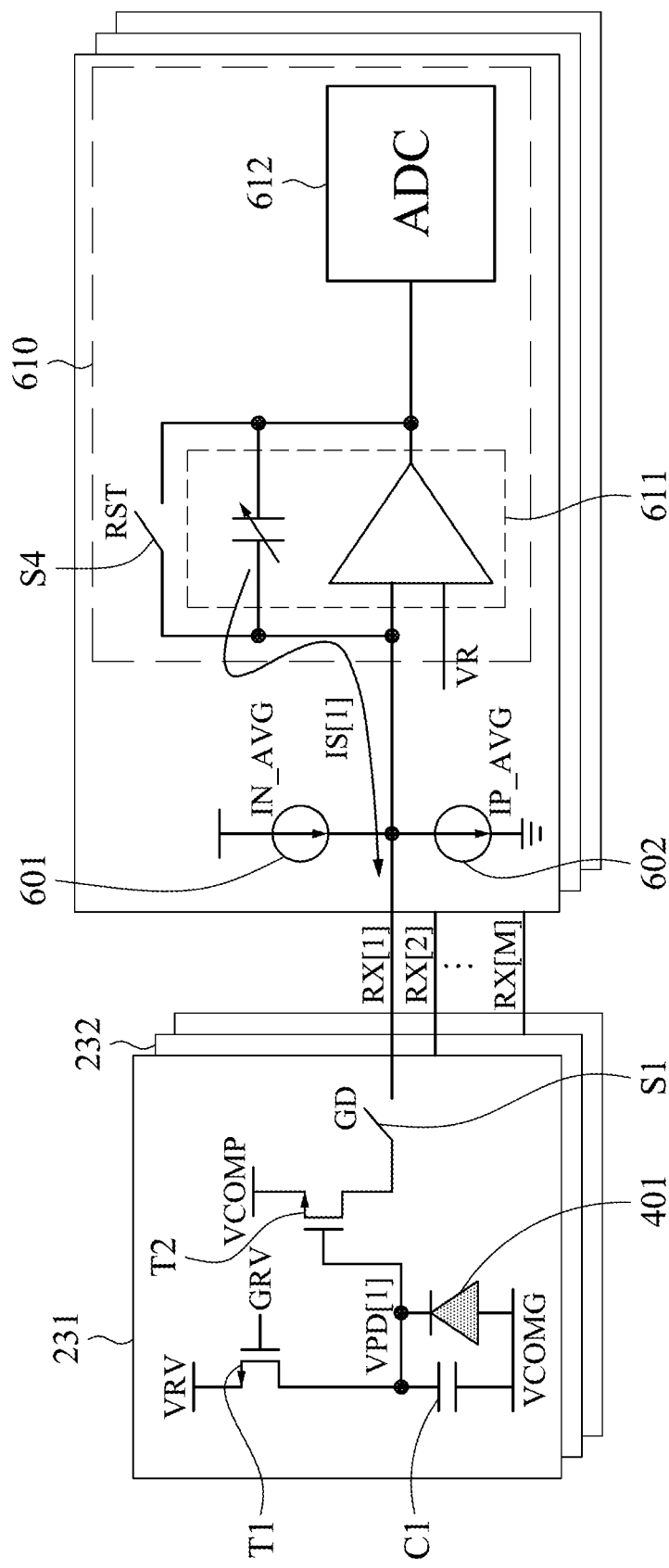
FIG. 6 is a schematic circuit diagram of the second pixel sensor in accordance with the first embodiment.

FIG. 6 illustrates the schematic circuit diagram of the second pixel sensor in accordance with the first embodiment. Each second pixel sensor is identical, and the second pixel sensor 231 is taken as an example herein. The second pixel sensor 231 is the same as the first pixel sensor, except that the photo sensor 401 is not covered by the shielding layer. The second pixel sensor 231 is electrically connected to a converting circuit 610 via the sensing line RX[1]. Current sources 601 and 602 are placed between the second pixel sensor 231 and the converting circuit 610. The current source 601 provides the average current IN_AVG, while the current source 602 provides the average current IP_AVG. From another perspective, the current source 601 is used to inject the average current IN_AVG into the sensing line RX[1], while the current source 602 is used to extract the average current IP_AVG from the sensing line RX[1]. During a sample period, the second pixel sensor 231 generates a second sensing current on the sensing line RX[1] in response to the light intensity detected by the photo sensor 401. The current source 601 and the current source 602 are used to subtract the corresponding average current from the second sensing current to generate a difference current IS[1]. As mentioned above, if the current direction has been determined in advance, only one of the current source 601 and the current source 602 needs to be set up. During a capture period, the converting circuit 610 outputs a digital signal in response to the difference current IS[1].

In this embodiment, the converting circuit 610 includes an integrator 611, an analog-to-digital converter (ADC) 612, and a reset switch S4. The input terminal of the integrator 611 is electrically connected to the second pixel sensor 231 through the sensing line RX[1], and the output terminal is connected to the analog-to-digital converter 612. The reset switch S4 is arranged between the input and output terminals of the integrator 611.

Referring to FIG. 4 and FIG. 6, since the photo sensor 401 of the first pixel sensor 251 is covered by the shielding layer 320, the calculated average current IP_AVG (or average current IN_AVG) represents the lowest brightness. Assuming the magnitude of the average current is 1 µA as a reference. Additionally, assuming that the current detected by the second pixel sensor 231 is within the range of 1-1.2 µA. The reference is subtracted from the range of 1-1.2 µA, yielding a difference current of 0-0.2 µA. As a result, the analog-to-digital converter 612 only needs to decode the range of 0-0.2 µA instead of the original range of 1-1.2 µA, which can reduce the required resolution of the analog-to-digital converter 612 (reducing cost) or increase the signal-to-noise ratio (SNR) at the same cost.

Figure 7:
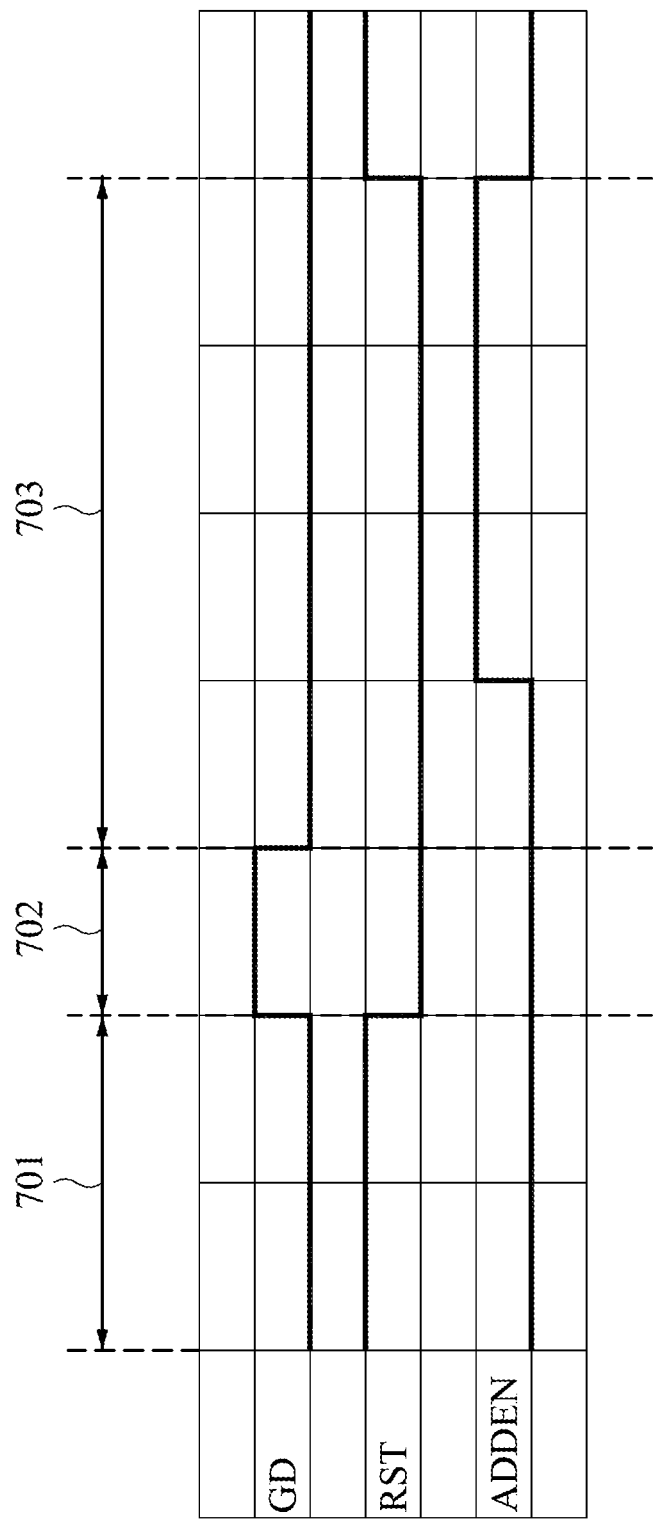
FIG. 7 is a timing diagram of the signals in FIG. 6.

Referring to FIGS. 4, 6, and 7. FIG. 7 shows the timing diagram for the signals in FIG. 6. The operation of the embodiment is divided into three periods: an exposure period 701, a sample period 702, and a capture period 703. The gate switch S1 is controlled by a signal GD, the reset switch S4 is controlled by a signal RST, and the analog-to-digital converter 612 is enabled or disabled by a signal ADCEN. During the exposure period 701, the gate switch S1 is turned off, the reset switch S4 is turned on, and the analog-to-digital converter 612 is disabled. The integrator 611 is discharged during this period. In the sample period 702, the gate switch S1 is turned on, the reset switch S4 is turned off, and the analog-to-digital converter 612 is disabled. The average current is subtracted from the sensing currents on the sensing lines RX[1]-RX[N] and then integrated during this period. In the capture period 703, the gate switch S1 is turned off, the reset switch S4 is turned off, and the analog-to-digital converter 612 is temporarily delayed and then enabled. During this period, the analog-to-digital converter 612 outputs the digital signal according to the difference current.

Second Embodiment

Figure 8:
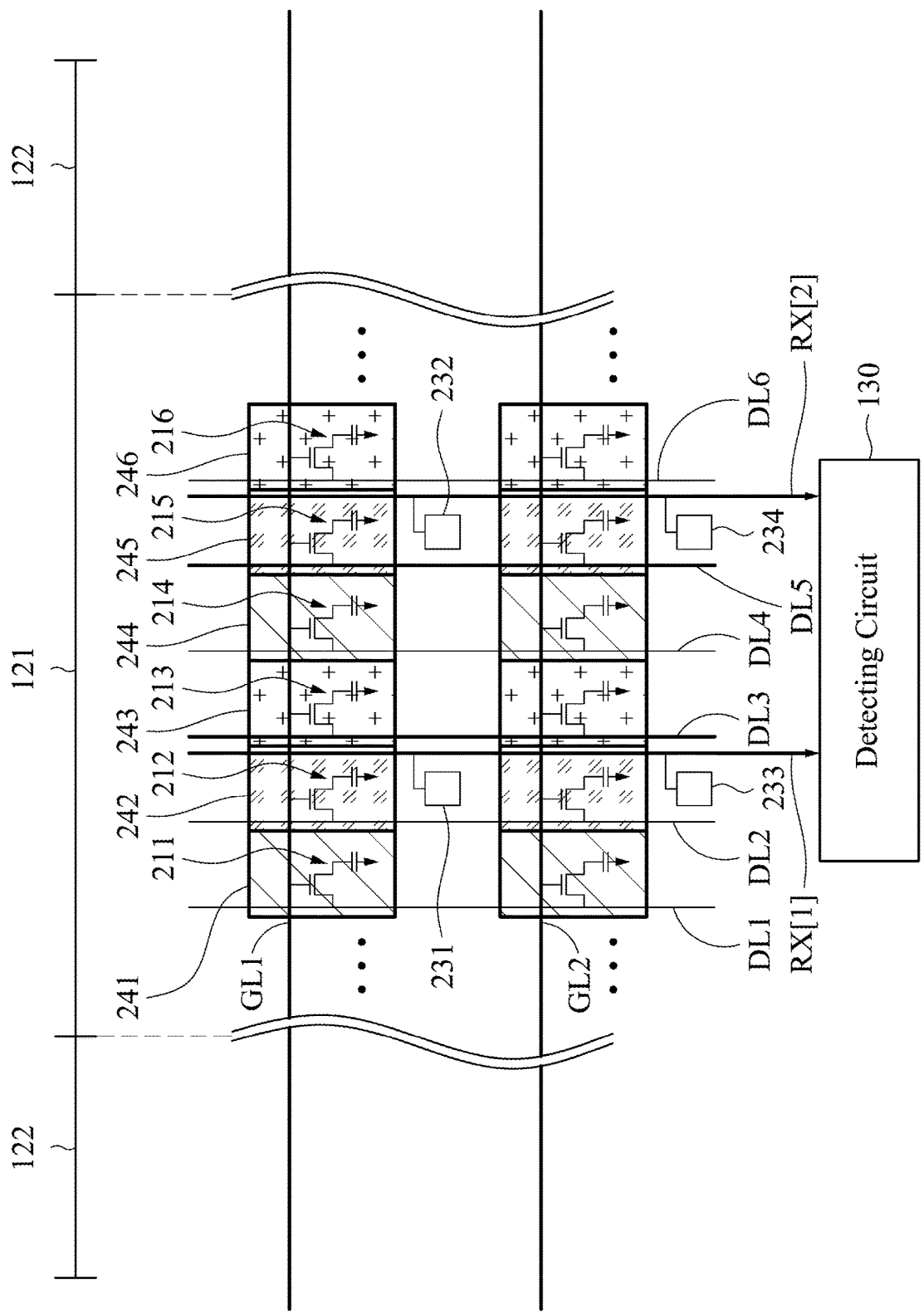
FIG. 8 is a diagram illustrating the arrangement of the pixel sensors in the display device according to the second embodiment.

In the second embodiment, the average current generated by the pixel sensors in the display area is calculated, and then the average is subtracted from the detected currents of the same pixel sensors. In other words, the first pixel sensor mentioned earlier is the same as the second pixel sensor, and these pixel sensors are both placed in the same row of pixels. FIG. 8 illustrates the arrangement of the pixel sensors in the display device according to the second embodiment. As shown in FIG. 8, no dummy pixel sensors are set in the non-display area 122 in the second embodiment.

Figure 9:
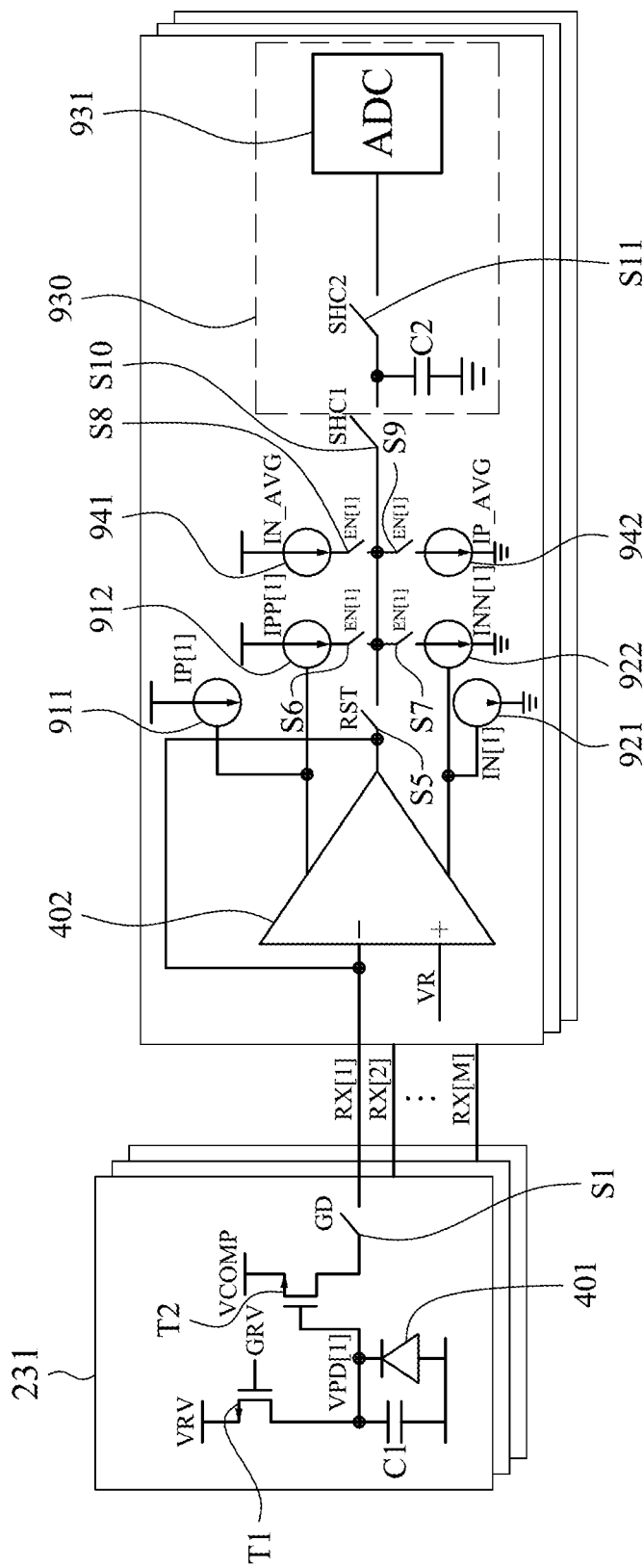
FIG. 9 is a schematic diagram of the relevant circuitry for the second pixel sensor based on the second embodiment.

Referring to FIG. 9 which is a schematic diagram of the relevant circuitry for the second pixel sensor based on the second embodiment. The structure of the second pixel sensor 231 has been described in the first embodiment, and thus it is not further explained here. The second pixel sensor 231 is electrically connected to the buffer 402 through the sensing line RX[1]. There are M second pixel sensors in total, where M is a positive integer. The M second pixel sensors are electrically connected to corresponding buffers through the sensing lines RX[1]-RX[M] respectively. Similarly, each second pixel sensor and its corresponding buffer are collectively referred to as a channel. The buffer 402 is the same as that in the first embodiment and thus will not be explained again. A converting circuit 930 is electrically connected to the buffer 402, and a reset switch S5 is arranged between the buffer 402 and the converting circuit 930. A switch S10 is arranged between the switch S5 and the converting circuit 930. The converting circuit 930 includes an analog-to-digital converter 931, a switch S11, and a sample capacitor C2. The switch S11 is arranged between the switch S10 and the analog-to-digital converter 931. One end of the sample capacitor C2 is arranged between the switch S10 and the switch S11, and the other end of the sample capacitor C2 is electrically connected to the ground terminal.

In the second embodiment, P-type output stages 911, 912 of the buffer 402 provide first reference currents IP[1] and IPP[1], respectively. It should be noted that first reference current IP[1] is the same as the first reference current IPP[1], but they are represented using different symbols due to their different purposes. Specifically, first reference current IP[1] is used to calculate the average current, the while first reference current IPP[1] is used for subsequent decoding. Similarly, N-type output stages 921 and 922 of the buffer 402 provide second reference currents IN[1] and INN[1], respectively, where IN[1] is the same as INN[1]. A switch S6 is arranged between the P-type output stage 912 and the converting circuit 930, while a switch S7 is arranged between the N-type output stage 922 and the converting circuit 930.

Figure 10:
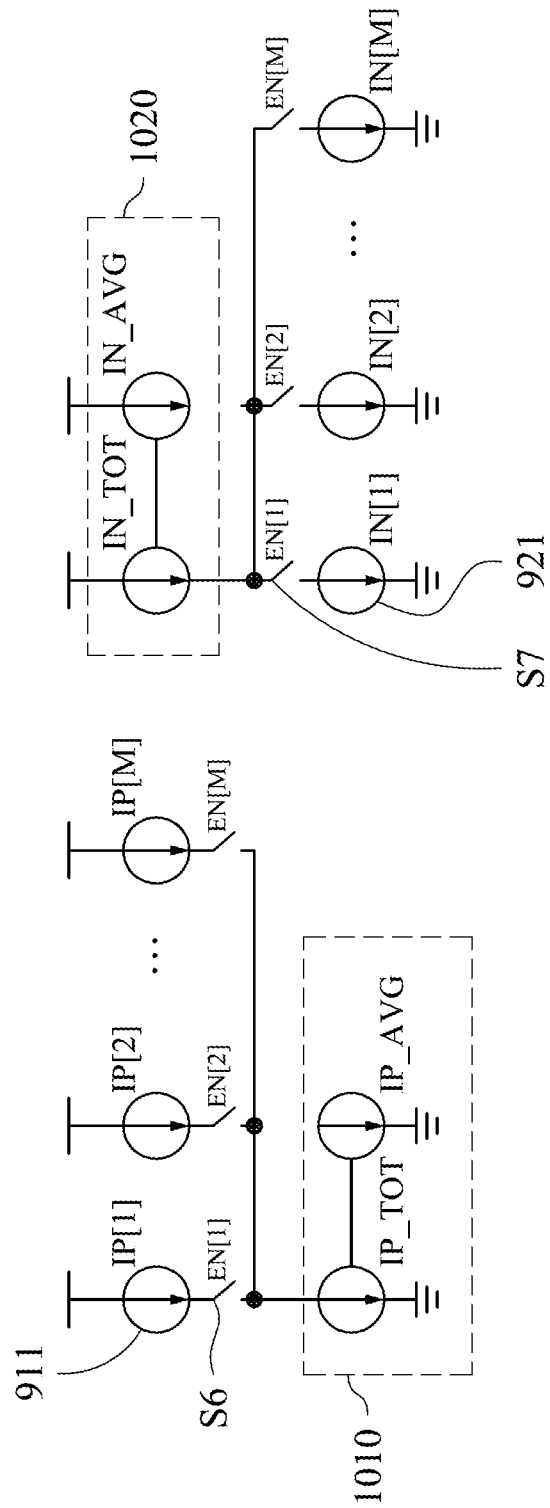
FIG. 10 is a schematic diagram of the average circuit in accordance with the second embodiment.

FIG. 10 is a schematic diagram of the average circuit in accordance with the second embodiment. Referring to FIG. 10, a first current mirror 1010 and a second current mirror 1020 together are referred to as the average circuit. The first current mirror 1010 is electrically connected to the P-type output stages of the buffers in all channels, thereby receiving the first reference currents IP[1]-IP[M]. The total current IP_TOT is equal to the sum of all first reference currents IP[1]-IP[M], and the gain of first current mirror 1010 is 1/M, which makes the average current IP_AVG equal to the total current IP_TOT divided by M. Similarly, the second current mirror 1020 is electrically connected to the N-type output stages (e.g. N-type output stage 921) in all channels to obtain the second reference currents IN[1]-IN[M]. The total current IN_TOT is equal to the sum of all second reference currents IN[1]-IN[M]. The gain of the second current mirror 1020 is also equal to 1/M, which makes the average current IN_AVG equal to the IN_TOT divided by the positive integer M.

Referring to FIG. 9, the current source 941 provides the average current IN_AVG, while the current source 942 provides the average current IP_AVG. Both the current sources 941 and 942 are located between the buffer 402 and the converting circuit 930. The current source 941 is configured to add the average current IN_AVG into the sample capacitor C2, while the current source 942 is used to extract the average current IP_AVG from the sample capacitor C2. In detail, when the current flows from the buffer 402 to the second pixel sensor 231 (i.e. the voltage VRV and the voltage CVOMP are negative), the current for the converting circuit 930 is mainly provided by the P-type output stage 912, and the current source 942 is configured to draw the base current, leaving the current to be detected. When the current flows from the second pixel sensor 231 to the buffer 402 (i.e. the voltage VRV and the voltage CVOMP are positive), the current for the converting circuit 930 is mainly provided by the N-type output stage 922, and the current source 941 is configured to draw the base current, leaving the current to be detected. If the direction of current flow between the second pixel sensor 231 and the buffer 402 is already determined in advance, then one of the corresponding current sources 941 and 942 may be omitted.

Figure 11:
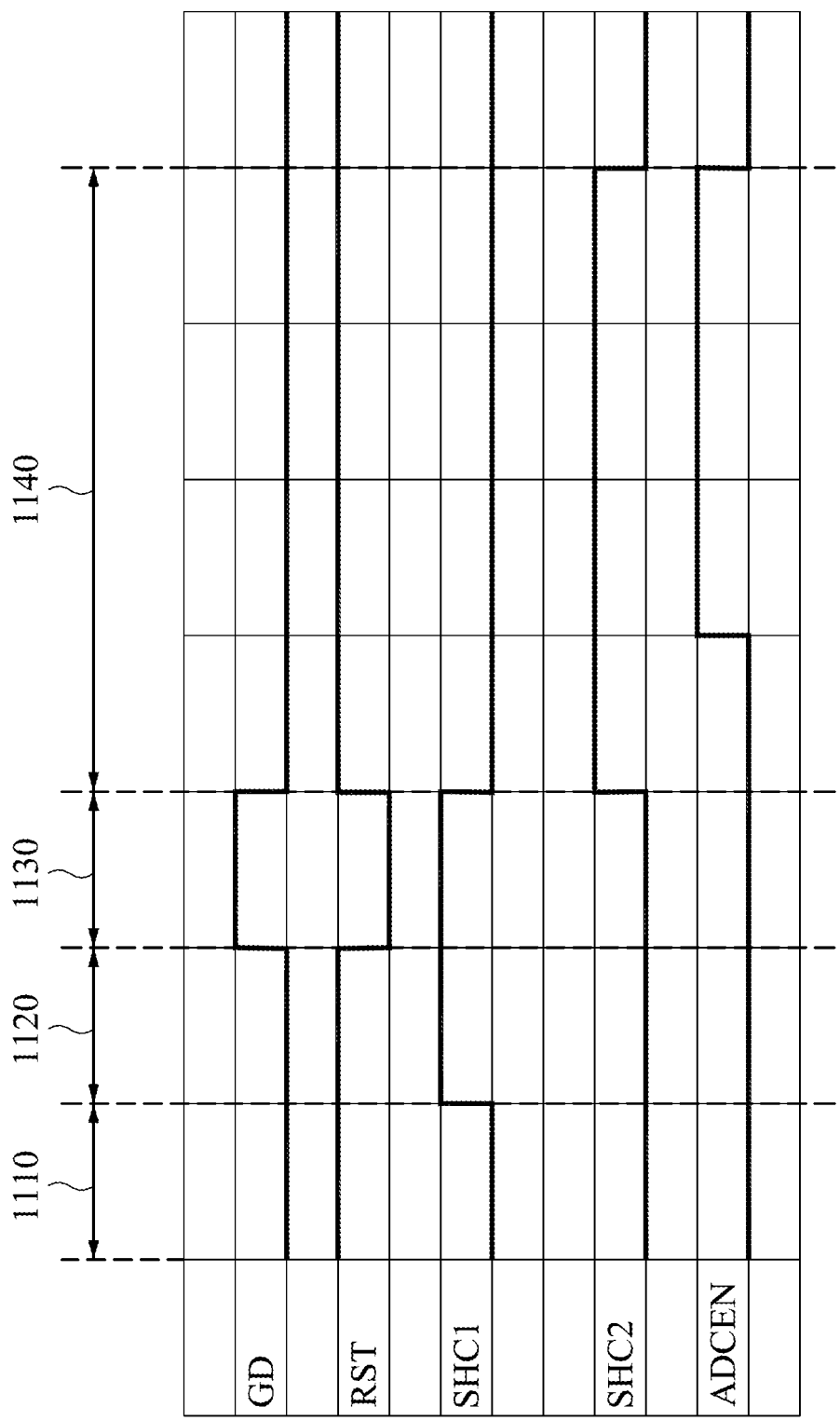
FIG. 11 is a timing diagram of various signals according to the second embodiment.

FIG. 11 is a timing diagram of various signals according to the second embodiment. Please refer to FIGS. 9 and 11. The gate switch S1 is controlled by a signal GD, the reset switch S5 is controlled by a signal RST, the switch S10 is controlled by a signal SHC1, the switch S11 is controlled by a signal SHC2, and the analog-to-digital converter 931 is enabled or disabled by a signal ADCEN.

During the exposure period 1110, the gate switch S1 is turned off, the reset switch S5 is turned on, the switch S10 is turned off, the switch S11 is turned off, and the analog-to-digital converter 931 is disabled. At this time, the photo sensor 401 is exposed to generate leakage current, which changes the voltage at the control terminal of the transistor T2.

During the reset period 1120, the gate switch S1 is turned off, the reset switch S5 is turned on, the first switch S10 is turned on, the second switch S11 is turned off, and the analog-to-digital converter 931 is disabled. At this time, the sample capacitor C2 is discharged (i.e. reset).

During the sample period 1130, the gate switch S1 is turned on, the reset switch S5 is turned off, the first switch S10 is turned on, the second switch S11 is turned off, and the analog-to-digital converter 931 is disabled. At this time, the second pixel sensor 231 outputs a sensing current through sensing line RX[1], and either average current IN_AVG or average current IP_AVG is subtracted from the sensing current to form a difference current. The sample capacitor C2 is charged based on the difference current.

During the capture period 1140, the gate switch S1 is turned off, the reset switch S5 is turned on, the first switch S10 is turned off, the second switch S11 is turned on, and the analog-to-digital converter 931 is enabled. At this time, the analog-to-digital converter 931 outputs a digital signal based on the voltage on the sample capacitor C2.

Assuming that the current detected by the second pixel sensor falls within the range of 1-1.2 µA, the calculated average current is approximately 1.1 µA (as a reference). By subtracting this reference from the sensing current, a difference current of −0.1 to +0.1 µA can be obtained. As a result, the analog-to-digital converter 931 only needs to decode the range of −0.1 to +0.1 µA range instead of the original range 1-1.2 µA. This can reduce the resolution requirement of the analog-to-digital converter 931 (reducing cost), or increase the signal-to-noise ratio at the same cost.

According to the above fingerprint sensing circuit, the average current can be calculated through dummy pixel sensors or existing pixel sensors in the display area. By subtracting the average current from the sensing current, device noise can be eliminated, thereby improving the signal-to-noise ratio.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A fingerprint sensing circuit, comprising:
a plurality of pixel sensors, comprising a plurality of first pixel sensors and a plurality of second pixel sensors, wherein each of the pixel sensors comprises a photo sensor;
a plurality of buffers, electrically connected and corresponding to the first pixel sensors respectively, wherein in a sample period, each of the first pixel sensors is configured to generate a first sensing current in response to a light intensity sensed by the corresponding photo sensor, and the buffers are configured to generate a plurality of reference currents in response to the first sensing currents;
an average circuit, configured to generate at least one average current by averaging the reference currents;
a converting circuit, electrically connected to one of the second pixel sensors; and
at least one current source, arranged between the converting circuit and the one of the second pixel sensors, wherein the at least one current source is configured to provide the at least one average current,
wherein in the sample period, the one of the second pixel sensors is configured to generate a second sensing current in response to a light intensity sensed by the corresponding photo sensor, and the at least one current source is configured to subtract the at least one average current from the second sensing current to generate a difference current,
wherein in a capture period, the converting circuit is configured to output a digital signal in response to the difference current.

2. The fingerprint sensing circuit of claim 1, wherein the photo sensors of the first pixel sensors are covered by a shielding layer.

3. The fingerprint sensing circuit of claim 2, wherein the second pixel sensors and the first pixel sensors are arranged in a same row of pixels.

4. The fingerprint sensing circuit of claim 2, wherein the buffers are unit gain buffers, and each of the buffers comprises:
a first input terminal, electrically connected to the corresponding first pixel sensor;
a second input terminal, electrically connected to a fixed voltage;
a P-type output stage, configured to provide a first reference current; and
a N-type output stage, configured to provide a second reference current.

5. The fingerprint sensing circuit of claim 4, wherein the at least one average current comprises a first average current and a second average current, and the average circuit comprises:
a first current mirror, electrically connected to the P-type output stages of the buffers and configured to provide the first average current; and
a second current mirror, electrically connected to the N-type output stages of the buffers and configured to provide the second average current.

6. The fingerprint sensing circuit of claim 5, wherein the at least one current source comprises a first current source and a second current source, the first current source is configured to provide the first average current, and the second current source is configured to provide the second average current.

7. The fingerprint sensing circuit of claim 6, wherein the converting circuit comprises:
an integrator, having an input terminal electrically connected to the one of the second pixel sensors;
an analog-to-digital converter, electrically connected to an output terminal of the integrator; and
a reset switch, arranged between the input terminal of the integrator and the output terminal of the integrator.

8. The fingerprint sensing circuit of claim 7, further comprising:
a plurality of gate switches, arranged in the first pixel sensors and the second pixel sensors respectively to output the first sensing currents or the second sensing current.

9. The fingerprint sensing circuit of claim 8,
wherein in a exposure period, the gate switches are turned off, the reset switch is turned on, and the analog-to-digital converter is disabled,
wherein in the sample period, the gate switches are turned on, the reset switch is turned off, and the analog-to-digital converter is disabled,
wherein in the capture period, the gate switches are turned off, the reset switch is turned off, and the analog-to-digital converter is enabled.

10. The fingerprint sensing circuit of claim 1, wherein the first pixel sensors are the same as the second pixel sensors respectively, and the first pixel sensors are arranged in a same row of pixels.

11. The fingerprint sensing circuit of claim 10, wherein the buffers are unit gain buffers, and each of the buffers comprises:
a first input terminal, electrically connected to the corresponding first pixel sensor;
a second input terminal, electrically connected to a fixed voltage;
a P-type output stage, configured to provide a first reference current; and
a N-type output stage, configured to provide a second reference current.

12. The fingerprint sensing circuit of claim 11, wherein the at least one average current comprises a first average current and a second average current, and the average circuit comprises:
a first current mirror, electrically connected to the P-type output stages of the buffers, a gain of the first current mirror is equal to a reciprocal of a number of the first pixel sensors, and the first current mirror is configured to provide the first average current; and
a second current mirror, electrically connected to the N-type output stages of the buffers, a gain of the second current mirror is equal to the reciprocal of the number of the first pixel sensors, and the second current mirror is configured to provide the second average current.

13. The fingerprint sensing circuit of claim 12, wherein the at least one current source comprises a first current source and a second current source, the first current source is configured to provide the first average current, and the second current source is configured to provide the second average current.

14. The fingerprint sensing circuit of claim 13, further comprising:
a plurality of gate switches, arranged in the first pixel sensors to output the first sensing currents;

a reset switch, arranged between one of the buffers and the converting circuit; and a first switch, arranged between the reset switch and the converting circuit.

15. The fingerprint sensing circuit of claim 14, wherein the converting circuit comprises:

an analog-to-digital converter, electrically connected to the one of the buffers;

a second switch, arranged between the first switch and the analog-to-digital converter; and a sample capacitor, having a first end arranged between the first switch and the second switch, and a second end electrically connected to a ground terminal.

16. The fingerprint sensing circuit of claim 15, wherein in an exposure period, the gate switches are turned off, the reset switch is turned on, the first switch is turned off, the second switch is turned off, and the analog-to-digital converter is disabled, wherein in a reset period, the gate switches are turned off, the reset switch is turned on, the first switch is turned on, the second switch is turned off, and the analog-to-digital converter is disabled, wherein in the sample period, the gate switches are turned on, the reset switch is turned off, the first switch is turned on, the second switch is turned off, and the analog-to-digital converter is disabled, wherein in the capture period, the gate switches are turned off, the reset switch is turned on, the first switch is turned off, the second switch is turned on, and the analog-to-digital converter is enabled.

\* \* \* \* \*